May 14, 1968     W. W. CHARRON     3,382,881
FLOAT MECHANISM FOR A CARBURETOR
Filed May 25, 1966                                        2 Sheets-Sheet 1
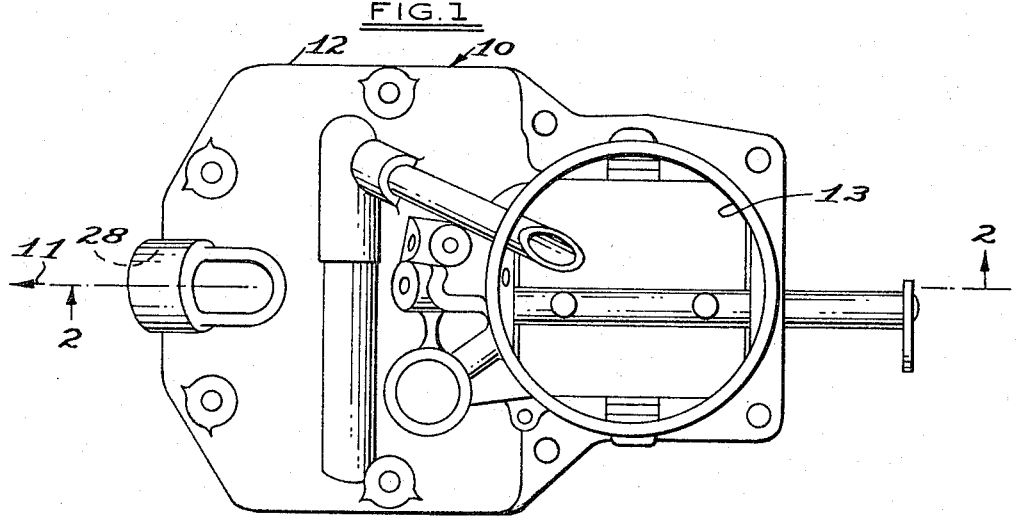
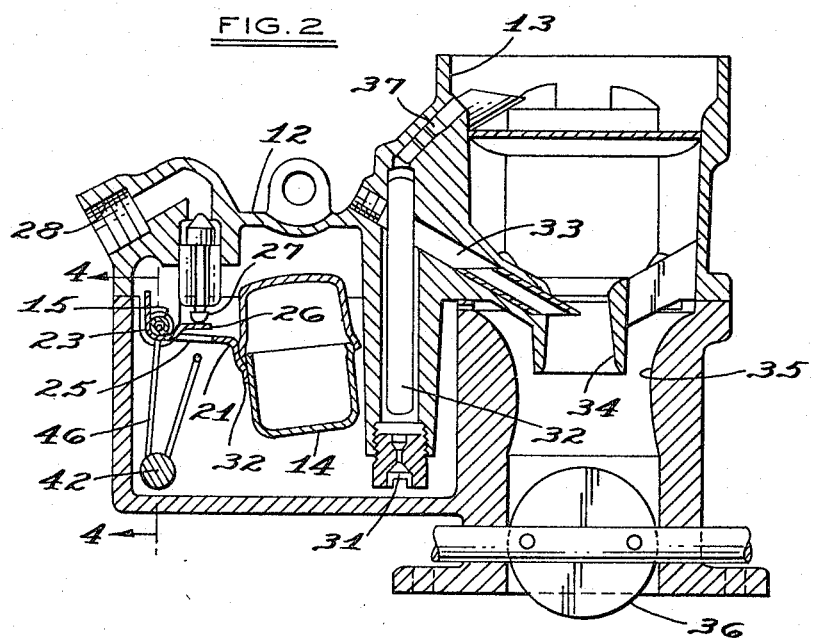
INVENTOR
WILLIAM W. CHARRON
BY
John R. Faulkner
Keith L. Zerschling
ATTORNEYS May 14, 1968  W. W. CHARRON  3,382,881
FLOAT MECHANISM FOR A CARBURETOR
Filed May 25, 1966  2 Sheets-Sheet 2
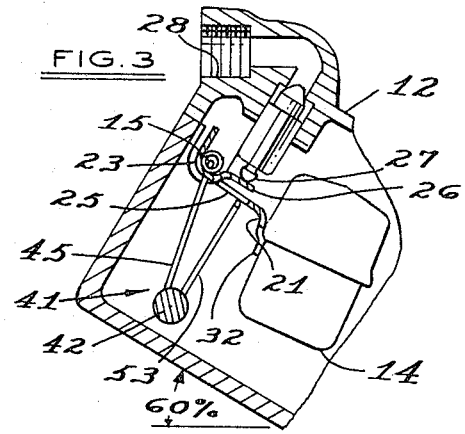
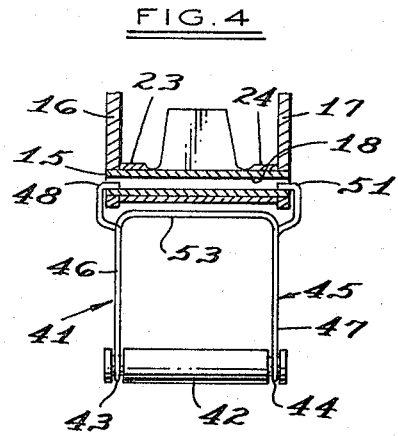
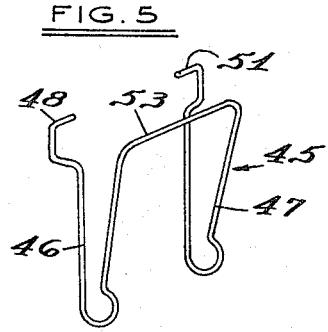
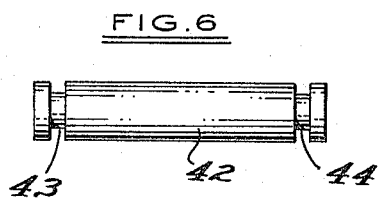
INVENTOR
WILLIAM W. CHARRON
BY John R. Faulkner
Keith L. Zerschling
ATTORNEYS United States Patent Office 3,382,881
Patented May 14, 1968

3,382,881
FLOAT MECHANISM FOR A CARBURETOR
William Warren Charron, Livonia, Mich., assignor to Ford Motor Company, Dearborn, Mich., a corporation of Delaware
Filed May 25, 1966, Ser. No. 552,785
2 Claims. (Cl. 137—39)

ABSTRACT OF THE DISCLOSURE

A pendulum assembly independently mounted on the shaft supporting the float in the carburetor fuel bowl exerts a closing force on the valve admitting fuel to the bowl when the carburetor is tilted in one direction, as when the vehicle is climbing a steep grade, but does not interfere with normal float operation during other carburetor attitudes. A bore is formed in the float support shaft and the ends of a wire holder fit into the bore. The wire holder projects downward, loops around a weight, and then projects upward, terminating in a horizontal portion adjacent the float support arm. When gravity moves the weight rearward, the horizontal portion contacts the arm to close the inlet valve despite the reduced buoyant forces acting on the float. When gravity moves the pendulum in the other direction, the float functions in the normal manner without interference from the pendulum assembly.

---

This invention relates to a float mechanism for a carburetor of an automotive vehicle, and more particularly to such a float mechanism in which an independently mounted pendulum assembly is provided for augmenting the closing force of the carburetor float when the vehicle in which the mechanism is mounted is ascending a steep grade.

Certain types of sport or work vehicles, such as, the Ford "Bronco," that may be used in rough country to ascend very steep grades or inclines have recently come into considerable use. The fuel level change in the carburetor fuel bowl and the reduction in the moment arm of the carburetor float when the vehicle ascends steep grades or inclines produces a situation in which the float alone cannot produce sufficient torque to keep the fuel bowl inlet valve seated. When this occurs, the fuel pump will pump a great amount of fuel into the fuel bowl and consequently an over-rich mixture is produced by the carburetor that will result in the stalling of the vehicle.

The present invention was designed and has been produced to obviate the above-mentioned difficulties. It comprises a float pendulum assembly which operatively engages the fuel bowl inlet valve when the vehicle is ascending a predetermined steep grade, for example, a grade of 60%. This float pendulum assembly is independently mounted with respect to the float so that it has no effect upon the fuel bowl inlet valve when the vehicle is in a level position or when the vehicle is descending a steep grade. For example, the float pendulum assembly may be independently mounted on the shaft that carries the carburetor float.

An object of the present invention is the provision of a pendulum assembly for a carburetor fuel bowl that will augment the closing torque of the carburetor float and hence the closing force on the fuel bowl inlet valve when the vehicle in which it is mounted is ascending a steep grade.

A further object of the invention is the provision of a pendulum assembly for a carburetor fuel bowl that will augment the closing torque of the carburetor float and hence the closing force on the fuel bowl inlet valve when the vehicle in which it is mounted is ascending a steep grade or incline, but will not affect or impair the closing force produced by the carburetor float on the fuel bowl inlet valve when the vehicle is operating on level ground or is descending a steep grade or incline.

A further object of the invention is the provision in a carburetor fuel bowl of an independently mounted pendulum assembly that will augment the closing force exerted by the carburetor float on the fuel bowl inlet valve, when the vehicle in which it is mounted is ascending steep grades or inclines, but will at other times be inoperative and, therefore, will not affect or impair the operation of the carburetor float and the fuel bowl inlet valve during other modes of operation.

Other objects and attendant advantages of the present invention may be more readily realized when the specification is considered in connection with the attached drawings, in which:

FIGURE 1 is a top plan view of the carburetor in which the present invention may be mounted;

FIGURE 2 is a sectional view taken along the lines 2—2 of FIGURE 1;

FIGURE 3 is a partial sectional view similar to that of FIGURE 2, but showing the float pendulum assembly, the float and fuel bowl of the carburetor positioned as they would be if the vehicle in which they are mounted were ascending a very steep grade or incline, for example, 60%;

FIGURE 4 is a sectional view taken along the lines 4—4 of FIGURE 2;

FIGURE 5 is a side elevational view of the wire-type pendulum weight holder of the present invention, and FIGURE 6 is a front elevational view of the pendulum weight of the present invention.

Referring now to the drawings in which like reference numerals designate like parts throughout the several views thereof, there is shown in FIGURE 1 a carburtor 10 which is mounted in an automotive vehicle such that a line 11 parallel to the longitudinal axis of the vehicle extends through the carburetor as shown, and the direction of forward movement of the vehicle in which the carburetor is mounted is in the direction of the arrow. The carburetor 10 has a fuel bowl 12 that is positioned forwardly along the line 11 from an air induction passage or horn 13.

Referring now to FIGURES 2 through 4, the fuel bowl 12 is provided with a float 14 that is mounted on a float shaft 15. The shaft 15 is in turn rotatably mounted in the fuel bowl by being positioned in apertures in a pair of depending brackets 16 and 17. The shaft 15 is positioned substantially transverse to the longitudinal axis of the vehicle and the line 11 and it has a central bore 18 positioned therein for a purpose to be later described. A supporting arm 21 for the float 14 is affixed to the float at 22 and is nonrotatably attached to the shaft 15 by means of wrapped-around edged portions 23 and 24. The central portion 25 of the support arm 21 has a struck-up tab 26 that engages a fuel bowl inlet valve 27 positioned in the fuel inlet passage 28. The fuel inlet passage is adapted to be connected to the fuel pump (not shown) of the vehicle in which the carburetor 10 is mounted.

During normal operations the float 14, when the fuel bowl is filled to a prescribed level, produces a force via the supporting arm 21 and its struck-up tab 26 on the fuel bowl inlet valve 27 sufficient to keep it closed against the force or pressure of the fuel being supplied to the fuel inlet 28 from the fuel pump. As fuel is supplied to the engine via the main metering jet 31, fuel passage 32, fuel and air passage 33 and the opening in the passage 33 positioned in the booster venturi 34, the fuel in the fuel bowl 12 will be drawn downwardly thereby lowering the float 14. This permits the fuel bowl inlet valve 27 to open against the pressure of the fuel supplied by the fuel pump thereby replenishing the supply of fuel in the fuel bowl 12 and again raising the float 14 sufficiently to close the fuel bowl inlet valve 27.

As is conventional in a vehicle carburetor, a main venturi 35 is positioned adjacent the booster venturi 34 and a throttle valve 36 is operated by a throttle linkage to control the amount of air flow through the air induction passage 13. Also as is conventional, an air bleed 37 is positioned in the air induction passage 13 so that the fuel in the fuel passage 32 may mix with the air present in the air bleed 37 to provide a fuel-air mixture in the fuel-air passage 33.

A pendulum assembly, generally designated by the numeral 41, is independently mounted with respect to the float 14 on the float shaft 15 and is rotatably mounted with respect to this shaft. This pendulum assembly 41 comprises a cylindrically-shaped pendulum weight 42 having a pair of annular grooves 43 and 44 positioned therein. A weight holder 45 that may be formed of wire having a relatively small diameter includes a first U-shaped section 46 and a second U-shaped section 47. The upper ends of these U-shaped sections terminate in inwardly extending tangs 48 and 51 respectively that fit into the bore 18 in the float shaft 15. As can be seen by the drawings, these tangs and the wire from which the holder 45 is formed have a diameter which is only a fraction of the diameter of the bore 18 in the float shaft 15. The U-shaped sections 46 and 47 are joined by a substantially horizontal central cross portion 53 and the bottom portions of these sections are received within the annular grooves 43 and 44 in the cylindrical pendulum weight 42.

During normal operation of the vehicle in which the penudulum assembly and the carburetor containing it are mounted, the float 14 operates independently of the pendulum assembly 41. As shown in FIGURES 2 through 4, the tangs 48 and 51 mount the holder 45 rotatably on the float shaft 15 and the cylindrical pendulum weight 42 is free, therefore, to move independently of the carburetor float 14. During normal operations of the vehicle, the carburetor 10 will be in the position shown in FIGURE 2. In this position, the central cross portion 53 of the holder 45 does not engage the support arm 21 that mounts the float 14 within the carburetor fuel bowl 12. The control of the fuel bowl inlet valve, therefore, is solely under the control of the float 14 via tab 26 engaging the end of valve 27.

If the vehicle in which the carburetor 10 and the pendulum assembly 41 are mounted ascends a very steep grade or incline, for example, on the order of 60% (which vehicles of the so-called "sport type" such as the Ford "Bronco" are designed to do) the fuel in the fuel bowl will change its level with respect to the float by moving towards the right side of the fuel bowl as viewed in FIGURE 2 and the moment arm that is effective between the center of buoyance of the float 14 and the fuel inlet valve 27 will be decreased. The float 14 alone, therefore, cannot produce sufficient force to keep the fuel inlet valve seated against the force of the fuel pressure present in the inlet 28. At this time, however, the weight 42 will be in the position shown in FIGURE 3 which shows the carburetor float bowl 12 positioned at a 60% angle compared to FIGURE 2. This will occur when the vehicle in which it is mounted ascends a 60% incline or grade. The central cross portion 53 of the holder 45 will engage the central portion 25 of bracket arm 21. The force of gravity acting on weight 42 will produce sufficient force on the central portion 25 to keep the float 14 in the position shown in FIGURE 3 and sufficient force acting through the tab 26 on the support arm 21 to keep the fuel valve 27 in a position to prevent a large amount of fuel that would flood the engine from entering the fuel bowl 12.

As stated above, it can be appreciated that during normal vehicle operation or if the vehicle should descend very steep grades, the pendulum assembly 41 is inoperative since the central cross portion 53 of holder 45 will not engage the support arm 21. In descending a steep incline, it can be seen that the weight 42 will move in the direction opposite to that in which it is shown in FIGURE 3 and if the incline is steep enough it will engage the side wall of the carburetor float bowl 12.

It has been found that the pendulum assembly of the present invention works very satisfactorily and satisfies the requirement that the carburetor float bowl not overfill and flood the engine of the vehicle when this vehicle is ascending an incline or grade of 60%.

The present invention thus provides an uncomplicated mechanism which is independently mounted with respect to a carburetor fuel bowl float that will be effective when the vehicle ascends steep grades to augment the closing torque of the carburetor float thereby preventing engine flooding, but will at other times not affect or impair the operation of the carburetor float in its function or purpose of controlling the level of the fuel in the fuel bowl.

It is to be understood that this invention is not to be limited to the exact construction shown and described, but that various changes and modifications may be made without departing from the spirit and scope of the invention as defined in the appended claims.

I claim:

1. In a carburetor for an internal combustion engine mounted in an automotive vehicle, a fuel bowl, a valve positioned to admit fuel to said fuel bowl, a shaft mounted in said fuel bowl adjacent said valve, a float mounted on said shaft, means coupled to said float and engaging said valve for closing said valve when the fuel in said fuel bowl reaches a predetermined level, a pendulum assembly rotatably mounted on said shaft independently of said float and having means operatively engaging said valve when said fuel bowl is tilted in one direction a predetermined amount from a horizontal position for exerting a closing force on said valve, said float operating independently of said pendulum assembly when the fuel bowl is tilted in the opposite direction, said shaft being mounted on an axis that is substantially transverse to the longitudinal axis of the vehicle, said pendulum assembly comprising a weight and a holder having means supporting said weight at a distance below said shaft, said holder having means engaging said means coupled to said float and engaging said valve when said fuel bowl is tilted said predetermined amount, said shaft having a longitudinal bore and said holder being constructed of wire having a substantially smaller diameter than the diameter of said bore, said holder comprising a pair of U-shaped portions with one of the ends of each of said U-shaped portions having inturned tangs positioned within the longitudinal bore in said shaft, the central portion of each of said U-shaped portions having means for holding said weight, and a central cross portion connecting the other ends of each of said U-shaped sections, said central cross portion comprising said engaging means.

2. A carburetor for an internal combustion engine mounted in an automotive vehicle comprising, a fuel bowl, a shaft mounted in said fuel bowl on an axis positioned transversely to the longitudinal axis of the vehicle, a float, means for mounting said float on said shaft with said float being positioned toward the rear of the fuel bowl and the automotive vehicle with respect to said shaft, a fuel valve mounted in said fuel bowl in a position intermediate said shaft and said float, said means including means for closing said fuel valve when the fuel in the fuel chamber reaches a predetermined level, a pendulum assembly rotatably mounted on said shaft independent of said float and having means engaging said last mentioned means for exerting a closing force on said fuel valve when the axis of the shaft is raised and a longitudinal axis passing through the fuel bowl is tilted a predetermined amount in one direction as a result of the automotive vehicle ascending a steep incline, said float operating independently of the engaging means when the fuel bowl is tilted in the opposite direction, said shaft having a central bore, said pendulum assembly comprising a weight and a holder constructed of wire having a substantially smaller diameter than the diameter of said bore, said holder comprising a pair of U-shaped portions with one of the ends of each of said U-shaped portions having inturned tangs positioned within the bore in said shaft, the central portion of each of said U-shaped sections having means for holding said weight, and a central cross portion connecting the other ends of each of said U-shaped sections, said central cross portion forming the means engaging said means for closing the fuel valve when the fuel in the fuel chamber reaches a predetermined level.

References Cited

UNITED STATES PATENTS

| 1,218,085 | 3/1917 | Jay | 261—70 X |
| 2,847,021 | 8/1958 | Carlson et al. | 261—72 X |

FOREIGN PATENTS

| 841,971 | 6/1952 | Germany. |

RONALD R. WEAVER, *Primary Examiner.*